(12) United States Patent
Fujimoto et al.

(10) Patent No.: US 6,195,183 B1
(45) Date of Patent: *Feb. 27, 2001

(54) IMAGE READING APPARATUS AND IMAGE SENSOR CHIP THERERFOR

(75) Inventors: Hisayoshi Fujimoto; Hiroaki Onishi; Toshihiko Takakura; Norihiro Imamura, all of Kyoto (JP)

(73) Assignee: Rohm Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,577

(22) Filed: Jul. 14, 1998

(30) Foreign Application Priority Data

| | | |
|---|---|---|
| Jul. 15, 1997 | (JP) | 9-189585 |
| Aug. 8, 1997 | (JP) | 9-214320 |
| Aug. 11, 1997 | (JP) | 9-216271 |
| Aug. 11, 1997 | (JP) | 9-216272 |

(51) Int. Cl.[7] .................................................. H04N 1/46
(52) U.S. Cl. ........................ 358/514; 358/512; 358/513
(58) Field of Search ................................ 358/514, 509, 358/512, 515, 505, 513, 506; 250/208.1

(56) References Cited

U.S. PATENT DOCUMENTS

| | | | | |
|---|---|---|---|---|
| 5,475,508 | * | 12/1995 | Maeshima et al. | 358/514 |
| 5,696,610 | * | 12/1997 | Imoto | 358/509 |
| 5,920,408 | * | 7/1999 | Nagano | 358/509 |
| 5,965,870 | * | 10/1999 | Tabata | 250/208.1 |
| 5,995,249 | * | 11/1999 | Sato et al. | 358/514 |

* cited by examiner

*Primary Examiner*—Cheukfan Lee
(74) *Attorney, Agent, or Firm*—Merchant & Gould P.C.

(57) ABSTRACT

An image reading apparatus includes a light source for irradiating a document sheet with light, a row of red light receiving elements arranged in a primary scanning direction for detecting a red component of the light reflected on the document sheet, a row of green light receiving elements arranged in the primary scanning direction for detecting a green component of the reflected light, and a row of blue light receiving elements arranged in the primary scanning direction for detecting a blue component of the reflected light. The row of red light receiving elements, the row of green light receiving elements and the row of blue light receiving elements are displaced from each other in a secondary scanning direction which is perpendicular to the primary scanning direction.

20 Claims, 15 Drawing Sheets

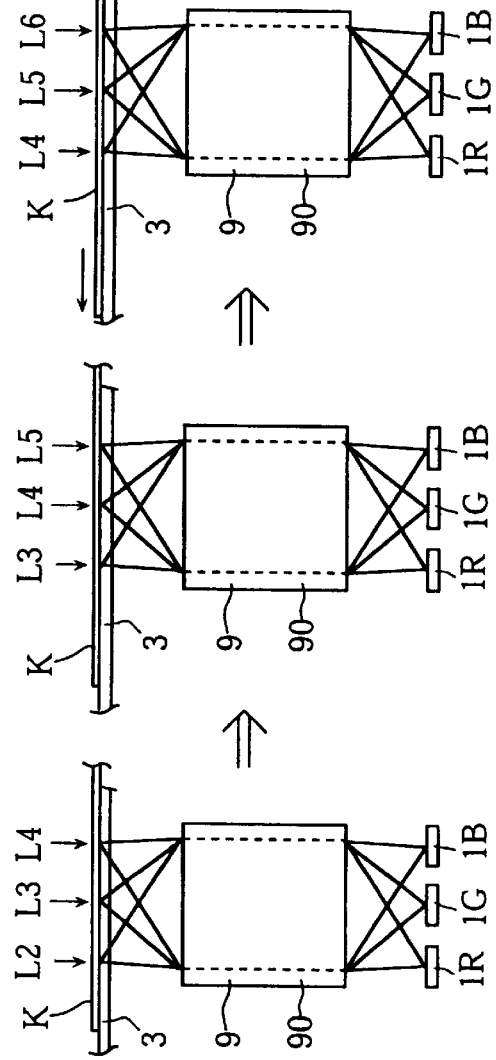

IMAGE READING APPARATUS AND IMAGE SENSOR CHIP THERERFOR

BACKGROUND OF THE INVENTION

1. Field of the Invention

The present invention relates to an image reading apparatus. More particularly, the present invention relates to a contact-type line image scanner for optically reading a document paper sheet in full color. The present invention also relates to an image sensor chip which may be advantageously incorporated in such an image scanner.

2. Description of the Related Art

In general, a full-color line image scanner comprises a light source for irradiating a document paper sheet with white light, apluralityof red light receiving elements for detecting a red light component of the white light reflected on the document sheet, a plurality of green light receiving elements for detecting a green light component of the reflected white light, and a plurality of blue light receiving elements for detecting a blue light component of the reflected white light. Each of the light receiving elements converts the detected amount of light into a corresponding electric signal.

FIG. 20 of the accompanying drawings illustrates a typical arrangement of light receiving elements in a full-color line image scanner. As shown, a plurality of red light receiving elements 80R, a plurality of green light receiving elements 80G, and a plurality of blue light receiving elements 80B are regularly arranged in a common single row. Specifically, groups of light receiving elements are arranged in a common row in such a manner that each group includes a red light receiving element 80R, a green light receiving element 80G and a blue light receiving element 80B. Each group of three different light receiving elements 80R, 80G, 80B, which corresponds to a single pixel or picture element, has a primary scanning direction dimension S2 and a secondary scanning direction dimension S3, whereas each light receiving element has a primary scanning direction dimension S1. Further, each of the light receiving elements 80R, 80G, 80B is covered by a correspondingly colored filter which allows selective passage of a relevant color component of the white light.

Since the three kinds of light receiving elements detect three different color components of the white light at the same time, the image scanner described above is capable of full-color image reading at high speed. However, the prior art image scanner has been found disadvantageous in the following points.

First, since each group of three different light receiving elements 80R, 80G, 80B corresponds to a single picture element, the primary scanning direction dimension S2 needs to be set equal to or less than the primary scanning direction dimension of the single picture element. Therefore, the primary scanning direction dimension S1 of each light receiving element must be set less than ⅓ of the primary scanning direction dimension of the single picture element. As a result, the light receiving area of each light receiving element inevitably becomes small, thus leading to a poor reading quality (i.e., a low electrical output). Such a problem is particularly remarkable when the pitch between the respective light receiving elements 80R, 80G, 80B is set small to increase the reading resolution.

Secondly, since the three different light receiving elements 80R, 80G, 80B in each group (corresponding to a single picture element) deviates positionally in the primary scanning direction, there may be a color deviation when the three light receiving elements in the same group read the same picture element of the document sheet.

In the third place, since the three light receiving elements 80R, 80G, 80B in each group are dedicated to different colors, they need to be separately covered by different filters. Therefore, there is a need for separately attaching as many filters as the light receiving elements, consequently resulting in a cost increase.

The above-described problems may be eliminated by providing three different light sources for emitting red light, green light and blue light toward a document sheet with a time lag. In this case, a single kind of light receiving elements in a single row is caused to successively detect the reflected different color light components.

However, the latter solution is also disadvantageous in that the image reading speed becomes low due to the need for actuating the different light sources with a time lag. Further, since each light receiving element (which is normally provided by a phototransistor) is successively caused to detect different colors, unexpected mixture of two or more colors may occur due to incomplete discharge of a charge of the phototransistor. More specifically, as shown in FIG. 21, a phototransistor constituting each light receiving element retains a certain amount of previous charge (represented as "charge remainder ratio") even after discharging for another light detection, so that two successive detection for two different colors may result in unexpected color mixture.

SUMMARY OF THE INVENTION

It is therefore an object of the present invention to provide an image reading apparatus wherein the light receiving area of each light receiving element may be maximized, thereby enhancing the quality of the read image.

Another object of the present invention is to provide an image reading apparatus which is capable of reading a document sheet at a high speed without inviting a reading quality deterioration.

A further object of the present invention is to provide an image sensor chip which may be advantageously incorporated in an image reading apparatus.

Still another object of the present invention is to provide an image sensor chip which may be manufactured at a low cost.

According to a first aspect of the present invention, there is provided an image reading apparatus comprising: a light source for irradiating a document sheet with light; a row of red light receiving elements arranged in a primary scanning direction for detecting a red component of the light reflected on the document sheet; a row of green light receiving elements arranged in the primary scanning direction for detecting a green component of the reflected light; and a row of blue light receiving elements arranged in the primary scanning direction for detecting a blue component of the reflected light; wherein the row of red light receiving elements, the row of green light receiving elements and the row of blue light receiving elements are displaced from each other in a secondary scanning direction which is perpendicular to the primary scanning direction.

According to the arrangement described above, since each row of light receiving elements, extending in the primary scanning direction is dedicated only to a single color, the width of each light receiving element can be rendered substantially equal to that of each pixel (picture element). Thus, the light receiving area of each light receiving element may be maximized to provide a good image reading quality. Such an advantage is particularly significant when the pitch between the light receiving elements in the primary scanning direction is made small to increase the reading resolution.

Further, the three rows of light receiving elements may be caused to read the document sheet along three different primary scanning lines at the same time without any deviation in the primary scanning direction, and each same primary scanning line is successively read by the three rows of light receiving elements. Therefore, the image reading apparatus is capable of reading the document sheet at a high speed to provide a full-color image.

Moreover, compared with the prior art image reading apparatus wherein each light receiving element is caused to read three different colors, the image reading apparatus of the present invention does not suffer an image deterioration due to a remainder charge of a phototransistor when shifting from one color to another.

According to a preferred embodiment, the light receiving elements in each row are arranged at a first pitch in the primary scanning direction, whereas the row of red light receiving elements, the row of green light receiving elements and the row of blue light receiving elements is arranged at a second pitch in the secondary scanning direction. The second pitch is an integer multiple of the first pitch. In other words, the second pitch may be equal to or double (or more) the first pitch.

Preferably, the row of green light receiving elements may be positioned between the row of red light receiving elements and the row of blue light receiving elements. Such an arrangement is particularly advantageous where the image reading apparatus further comprises a lens array for focusing the reflected light at the row of green light receiving elements.

The light source may comprise an elongated lamp such as a cold-cathode tube.

Alternatively, the light source may comprise a plurality of light emitting diodes each generating light of a different color. In this case, the image reading apparatus should preferably comprise a light guide for propagating the light from the light emitting diodes in the primary scanning direction and for directing the propagating light toward the document sheet. Instead of utilizing a plurality of light emitting diodes, use may be made of a white light emitting diode.

Advantageously, the image reading apparatus may comprise adjusting means for adjusting output of each light receiving element.

According to a second aspect of the present invention, there is provided an image sensor chip comprising: a chip substrate; a row of red light receiving elements formed in the chip substrate and arranged in a first direction for detecting red light; a row of green light receiving elements formed in the chip substrate and arranged in the first direction for detecting green light; and a row of blue light receiving elements formed in the chip substrate and arranged in the first direction for detecting red light; wherein the row of red light receiving elements, the row of green light receiving elements and the row of blue light receiving elements are displaced from each other in a second direction which is perpendicular to the first direction.

According to a preferred embodiment, the image sensor chip further comprises: a red filter commonly covering the row of red light receiving elements for allowing selective passage of red light; a green filter commonly covering the row of green light receiving elements for allowing selective passage of green light; and a blue filter commonly covering the row of blue light receiving elements for allowing selective passage of blue light.

Preferably, each of the filters may be slightly larger in length and width than a corresponding row of light receiving elements.

Each of the filters may be made of a correspondingly colored photosensitive resin.

Alternatively, each of the filters comprises a correspondingly colored film. The films constituting the filters may be laminated on each other. In this case, however, the red filter film has windows corresponding to the row of green light receiving elements and the row of blue light receiving elements, whereas the green filter film has windows corresponding to the row of red light receiving elements and the row of blue light receiving elements. Further, the blue filter film has windows corresponding to the row of red light receiving elements and the row of green light receiving elements.

Preferably, each row of light receiving elements is surrounded by a light-impervious portion. Such a light-impervious portion may be provided by the portion of the laminate of the filter films where no window is formed.

Preferably, the light receiving elements in each row may be arranged at a first pitch in the primary scanning direction, whereas the row of red light receiving elements, the row of green light receiving elements and the row of blue light receiving elements may be arranged at a second pitch in the secondary scanning direction. The second pitch is an integer multiple of the first pitch. In other words, the second pitch may be equal to or double (or more) the first pitch.

Preferably, the row of green light receiving elements may be positioned between the row of red light receiving elements and the row of blue light receiving elements. Such an arrangement is particularly advantageous where the image reading apparatus further comprises a lens array for focusing the reflected light at the row of green light receiving elements.

Other features and advantages of the present invention should become clear from the detailed description to be made hereinafter referring to the accompanied drawings.

BRIEF DESCRIPTION OF THE DRAWINGS

In the accompanying drawings:

FIGS. 7a through 7d are schematic views illustrating the successive steps of reading a document paper with the image reading apparatus;

FIGS. 8a through 8d are tables illustrating the image signals progressively obtained by the successive reading steps shown in FIGS. FIGS. 7a through 7d;

DETAILED DESCRIPTION OF THE PREFERRED EMBODIMENT

The preferred embodiments of the present invention will be specifically described below with reference to the accompanying drawings.

Figure 1:
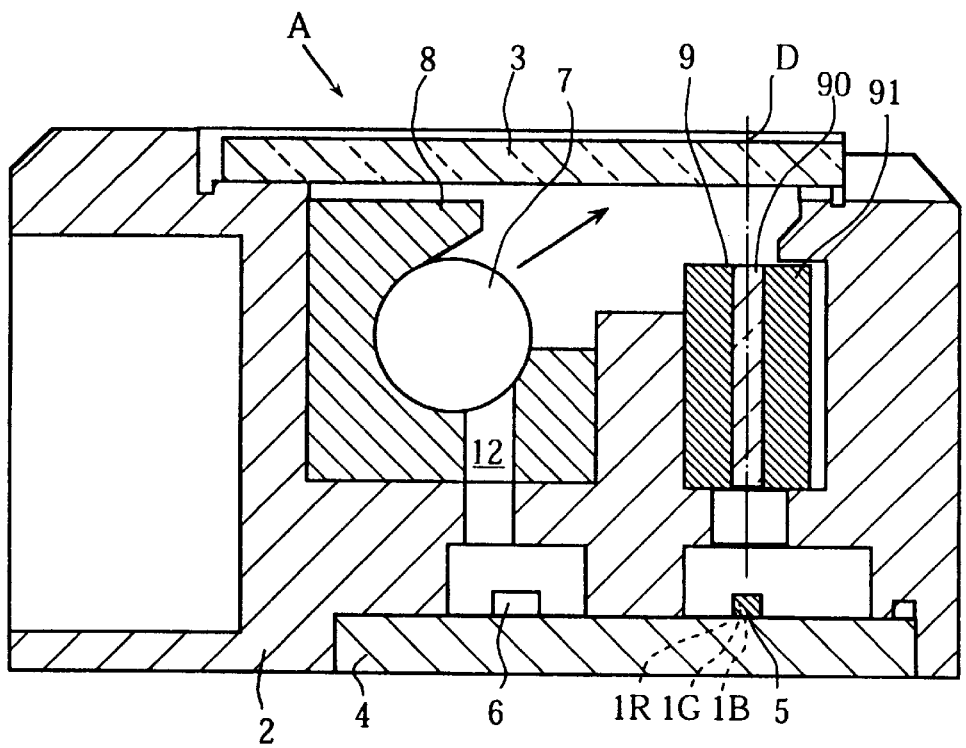
FIG. 1 is a view, in transverse section, showing an image reading apparatus according to a first embodiment of the present invention.

FIG. 1 of the accompanying drawings shows an overall view of an image reading apparatus according to a first embodiment of the present invention. The image reading apparatus of this embodiment is a contact-type line image scanner A which mainly comprises a case 2, a glass cover 3, a circuit board 4, a cold-cathode tube 7, a light reflecting holder 8, and a lens array 9.

The case 2 accommodates the various components described above. The case 2 may be made of a synthetic resin for example. In the illustrated embodiment, the case 2 is elongated in one direction and has a box configuration.

The glass cover 3 is mounted on the case 2 from above to close an upper opening thereof. Though not shown in FIG. 1, a platen roller is arranged in facing relation to the glass cover 3, and a document paper is held between the glass cover 3 and the platen roller. Thus, when the platen roller is driven to rotate, the document paper is advanced in contact with the glass cover. The document paper may be transferred stepwise at a constant pitch, or continuously.

The circuit board 4 is attached to the case 2 from below to close a lower opening thereof. The circuit board 4 has an upper surface (inner surface with respect to the case 2) for mounting an array of image sensor chips 5 and a control IC chip 6 for controlling the array of image sensor chips. Though not shown in FIG. 1, the upper surface of the circuit board 4 is also formed with a wiring pattern for electrically connecting the control IC chip 6 to the array of image sensor chips 5 and for electrically connecting between the respective sensor chips 5 in the array. The details of each image sensor chip 5 will be described hereinafter.

Figure 2:
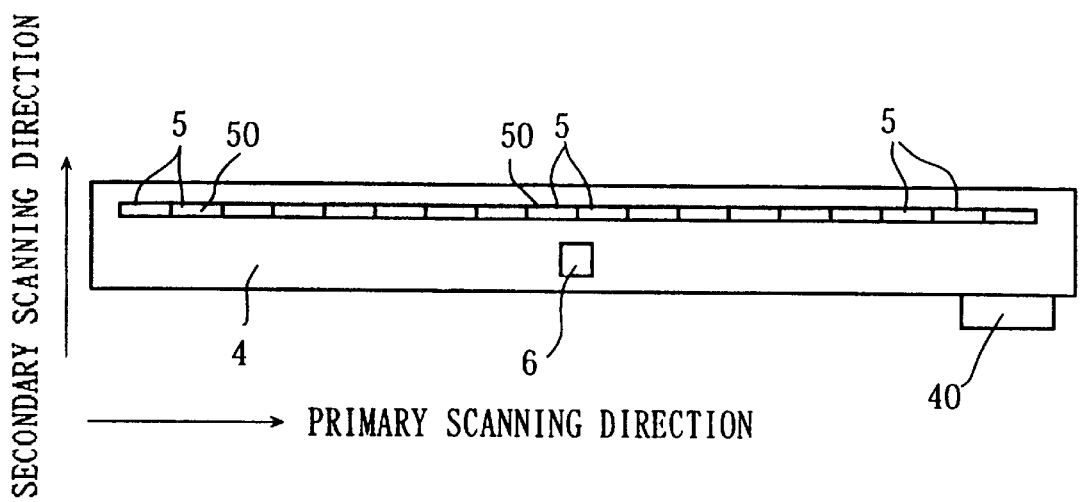
FIG. 2 is a plan view showing a circuit board incorporated in the same image reading apparatus.

As shown in FIG. 2, the circuit board 4 is elongated in a primary scanning direction, and the array of image sensor chips 5 extends in the primary scanning direction. Further, as also shown in FIG. 2, the circuit board 4 is provided with a connector 40 for establishing connection with an external circuit or unit. The document paper (not shown) is transferred in a secondary scanning direction which is perpendicular to the primary scanning direction.

Returning to FIG. 1, the cold-cathode tube 7 serves as a white light source and extends in the primary scanning direction for uniformly irradiating the document paper (not shown) with white light over substantially the entire length of the array of image sensor chips 5. An electric circuit (not shown) including e.g., an inverter circuit may be provided at a suitable portion within the case 2. If necessary or preferred, the cold-cathode tube 7 may be replaced by one or more white LEDs.

The light reflecting holder 8 supports the cold-cathode tube 7 within the case 2 while efficiently reflecting white light toward the glass cover 3 with a high reflectivity. Due to the provision of the light reflecting holder 8, the white light generated by the cold-cathode tube 7 is concentratively directed to a scanning position D on the glass cover 3 as a strip or line extending in the primary scanning direction.

The lens array 9 includes an array of selfoc lenses (self-focusing lenses) 90 housed in a holder block 91 and extending in the primary scanning direction. The lens array 9 is positioned between the glass cover 3 and the array of image sensor chips 5 for focusing the light reflected on the document paper (not shown) onto the array of image sensor chips 5, thereby forming non-inverted, non-magnified images read from the document paper. If preferred or necessary, the lens array 9 may include two or more arrays of selfoc lenses for focusing the reflected light along two or more lines.

Figure 3:
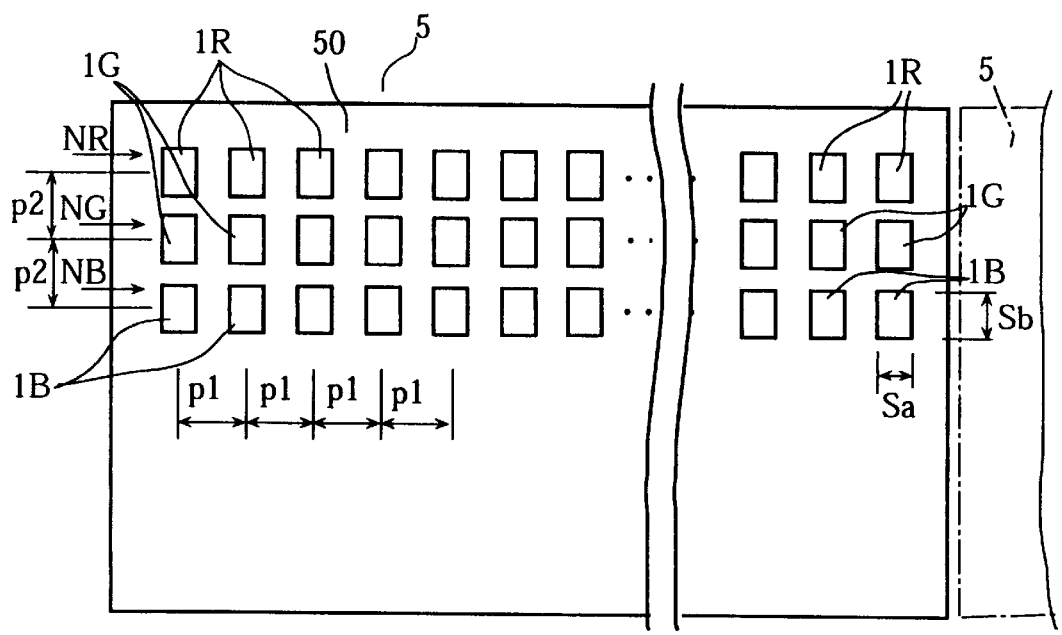
FIG. 3 is an enlarged plan view showing an image sensor chip incorporated in the same image reading apparatus with color filters removed.

As shown in FIG. 3, each of the image sensor chips 5, which is rectangular in plan view, comprises plural rows NR, NG, NB of light receiving elements 1R, 1G, 1B built in a silicon substrate 50 by wafer process to extend in the primary scanning direction, and the respective rows include a different kind of light receiving elements in identical number and arrangement. According to the illustrated embodiment, specifically, the sensor chip comprises a first row NR of red light receiving elements 1R, a second row NG of green light receiving elements 1G, and a third row NB of blue light receiving elements 1B, arranged in the mentioned order in the secondary scanning direction. Thus, the second row NG of green light receiving elements 1G is interposed between the first row NR of red light receiving elements 1R and the third row NB of blue light receiving elements 1B.

Figure 4:
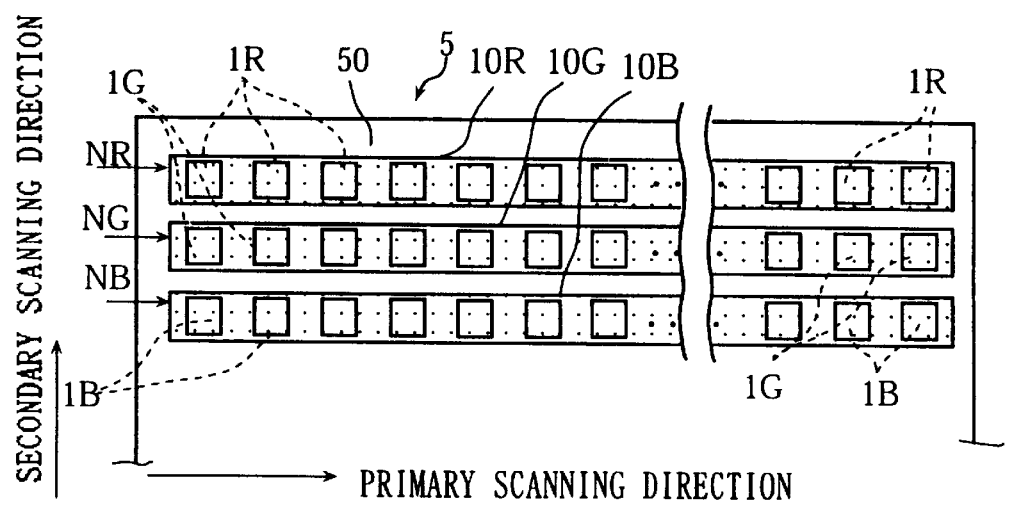
FIG. 4 is an enlarged plan view similar to FIG. 3 but showing the same image sensor chip with the color filters attached.

Typically, each of the light receiving elements 1R, 1G, 1B may comprise a phototransistor which is capable of providing photoelectric conversion for generating a voltage in accordance with the amount of received light. The color selectivity of the phototransistor may be provided by using a color filter. Thus, as shown in FIG. 4, the first row NR of red light receiving elements 1R is commonly covered by a red filter 10R which allows selective permeation of red light, whereas the second row NG of green light receiving elements 1G is commonly covered by a green filter 10G which allows selective permeation of green light. Similarly, the third row NB of blue light receiving elements 1B is commonly covered by a blue filter which allows selective permeation of blue light. Each of the color filters 10R, 10G, 10B, which may be made of e.g., an appropriately colored photosensitive resin or film, is slightly larger in length and width than a corresponding row of light receiving elements.

Returning to FIG. 3, each row NR, NG, NB of light receiving elements 1R, 1G, 1B in each image sensor chip 5 may include 96 light receiving elements for example, and the pitch p1 between the light receiving elements in the primary scanning direction may set to be 125 μm for reading the document paper (not shown) at a reading resolution of 8 dots/mm. Further, the pitch p2 between the light receiving elements in the secondary scanning direction may be set to an integer multiple of the primary scanning direction pitch p1. In the illustrated embodiment, p2=p1.

As appreciated from FIG. 2, each of the image sensor chips 5 is mounted on the circuit board 4 with its longitudinal axis extending in the primary scanning direction. Therefore, each row NR, NG, NB of light receiving elements 1R, 1G, 1B of each image sensor chip 5 is aligned with a corresponding row of light receiving elements of any other image sensor chip with respect to the secondary scanning direction. For enabling the respective image sensor chips 5 to be positioned accurately on the circuit board 4, each of the image sensor chips 5 may be formed with a positional reference mark (not shown).

The number of the image sensor chips 5 to be mounted on the circuit board 4 may be selected depending on the width of the 15 document paper (not shown) to be read by the scanner A (FIG. 1). For instance, if a DIN A4-size document paper is read at a resolution of 8 dots/mm, 18 image sensor chips each having 96 light receiving elements in each row (for each color) need be mounted on the circuit board 4.

Figure 5:
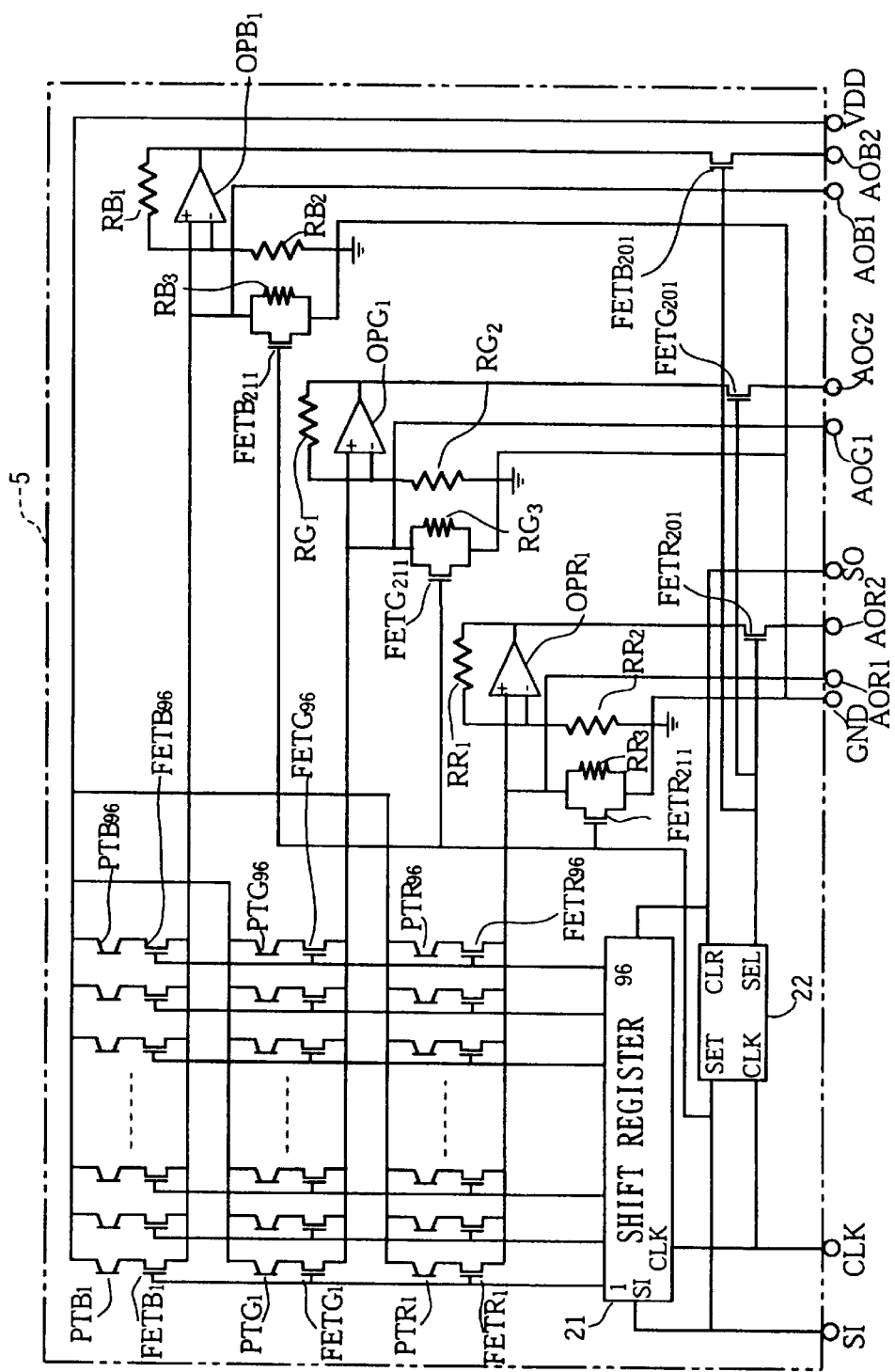
FIG. 5 is a circuit diagram of the image sensor chip.

Each of the image sensor chips 5 has a photoelectric conversion circuit for its operation, as shown in FIG. 5. More specifically, the photoelectric conversion circuit incorporates a shift register 21, a chip selector 22, a group of red light phototransistors $PTR_1 \sim PTR_{96}$ (constituting the red light receiving elements 1R), a group of green light phototransistors $PTG_1 \sim PTG_{96}$ (constituting the green light receiving elements 1G), a group of blue light phototransistors $PTB_1 \sim PTB_{96}$ (constituting the blue light receiving elements 1B), a group of first red light field-effect transistors $FETR_1 \sim FETR_{96}$, a group of first green light field-effect transistors $FETG_1 \sim FETG_{96}$, a group of first blue light field-effect transistors $FETB_1 \sim FETB_{96}$, a second red light field-effect transistor $FETR_{201}$, a second green light field-effect transistor $FETG_{201}$, a second blue light field-effect transistor $FETB_{201}$, a third red light field-effect transistor $FETR_{211}$, a third green light field-effect transistor $FETG_{211}$, a third blue light field-effect transistor $FETB_{211}$, a red light operation amplifier $OPR_1$, a green light operation amplifier $OPG_1$, a blue light operation amplifier $OPB_1$, a group of three red light resistors $RR_1 \sim RR_3$, a group of three green light resistors $RG_1 \sim RG_3$, a group of three blue light resistors $RB_1 \sim RB_3$, and eleven terminal pads SI, CLK, GND, AOR1, AOR2, SO, AOG1, AOG2, AOB1, AOB2, VDD. Each of the first field-effect transistors $FETR_1 \sim FETR_{96}$, $FETG_1 \sim FETG_{96}$, $FETB_1 \sim FETB_{96}$, the second field-effect transistors $FETR_{201}$, $FETG_{201}$, $FETB_{201}$ and the third field-effect transistors $FETR_{211}$, $FETG_{211}$, $FETB_{211}$ may be a MOS (metal oxide semiconductor) field-effect transistor. Selected ones of the pads SI, CLK, GND, AOR1, AOR2, SO, AOG1, AOG2, AOB1, AOB2, VDD are connected to an external circuitry (not shown) through the connector 40 (see FIG. 2). The pad SI receives serial-in signals. The pad CLK is fed with clock signals of e.g., 8 MHz. The pad GND is used for grounding purposes. The pad AOR1 outputs a non-amplified analog image signal corresponding to the received amount of red light, whereas the pad AOR2 outputs an amplified red image signal. The pad AOG1 outputs a non-amplified analog image signal corresponding to the received amount of green light, whereas the pad AOG2 outputs an amplified green image signal. The pad AOB1 outputs a non-amplified analog image signal corresponding to the received amount of blue light, whereas the pad AOB2 outputs an amplified blue image signal. The pad SO outputs serial-out signals. The pad VDD is supplied with a logic power voltage of 5 volts for example.

Image reading by the image scanner A (FIG. 1) takes place serially or successively from one image sensor chip 5 to the next in the array (consisting of 18 image sensor chips in the illustrated embodiment). Specifically, for example, the serial image reading starts from the left-end image sensor chip 5 (first image sensor chip) in the array shown in FIG. 2 and ends at the right-end image sensor chip (last image sensor chip). The image reading process in each of the image sensor chips 5 is performed in the following manner.

While clock signals of e.g., 8 MHz are input to the pad CLK, serial-in signals are supplied to the pad SI. The serial-in signals thus supplied are input to a set terminal of the chip selector 22. As a result, the chip selector 22 outputs high-level select signals from a select-out terminals in synchronism with the clock signals. The high-level select signals, which are obtained by inverting the clock signals, are then input to the respective gates of the second field-effect transistors $FETR_{201}$, $FETG_{201}$, $FETB_{201}$, thereby causing these transistors to turn on while the clock signals are held at the low level.

On the other hand, the serial-in signals are also supplied to a serial-in terminal of the shift register 21 in synchronism with the clock signals which are input to a clock terminal of the shift register 21. When a serial-in signal is input to the first bit of the shift register in synchronism with the drop of a clock signal, the first bit becomes ON to feed a high-level signal to the respective gates of the first field-effect transistors $FETR_1$, $FETG_1$, $FETB_1$ (corresponding to the first bit of the shift register 21), thereby causing these transistors to turn on. At this time, since the clock signal is at the low level, the respective third field-effect transistors $FETR_{211}$, $FETG_{211}$, $FETB_{211}$ receiving the clock signal without inversion are held OFF. As a result, a current passes through the respective resistors $PR_3$, $PG_3$, $PB_3$ due to the charge which is accumulated at the respective phototransistors $PTR_1$, $PTG_1$, $PTB_1$ and discharged through the relevant first field-effect transistors $FETR_1$, $FETG_1$, $FETB_1$. The voltage across the respective resistors $PR_3$, $PG_3$, $PB_3$ is input to the non-inverting terminal of the respective operation amplifiers $OPR_1$, $OPG_1$, $OPB_1$ and thereby amplified with an amplification factor which is determined by the resistance ratio between a respective one of the resistors $PR_1$, $PG_1$, $PB_1$ and a respective one of the resistors $PR_2$, $PG_2$, $PB_2$. The amplified voltage thus obtained is output from the respective pads AOR2, AOG2, AOB2 through the respective second field-effect transistors $FETR_{201}$, $FETG_{201}$, $FETB_{201}$ which are held ON while the clock signal is held at the low level, i.e., while the select signal is held at the high level. At the same time, the non-amplified voltage across the respective resistors $PR_3$, $PG_3$, $PB_3$ is output from the respective pads AOR1, AOG1, AOB1.

Conversely, when the clock signal rises from the low level to the high level, the respective second field-effect transistors $FETR_{102}$, $FETG_{201}$, $FETB_{201}$ turn off, but the respective third field-effect transistors $FETR_{211}$, $FETG_{211}$, $FETB_{211}$ turn on. As a result, no output is available from the respective pads AOR2, AOG2, AOB2, and the remaining charge of the respective phototransistors $PTR_1$, $PTG_1$, $PTB_1$ is discharged through the respective first field-effect transistors $FETR_1$, $FETG_1$, $FETB_1$ and the respective third field-effect transistors $FETR_{211}$, $FETG_{211}$, $FETB_{211}$. When the clock signal subsequently drops again from the high level to the low level, the serial-in signal previously held at the first bit of the shift register 21 is shifted to the second bit to turn on the respective first field-effect transistors FETR2, FETG2, FETB2 corresponding to the second bit, and the respective second field-effect transistors FETR102, FETG201, FETB201 turn on. As a result, the charge of the respective second-bit phototransistors PTR2, PTG2, PTB2 is discharged through the relevant first field-effect transistors FETR2, FETG2, FETB2, thereby generating a voltage across the respective resistors PR3, PG3, PB3. The voltage thus generated is output from the respective pads AOR1, AOG1, AOB1 without amplification as well as from the respective pads AOR2, AOG2, AOB2 after amplification at the respective amplifiers OPR1, OPG1, OPB1.

By repeating the above steps, the other phototransistors PTR3~PTR96, PTG3~PTG96, PTB3~PTB96 of the same image sensor chip 5 (the first image sensor chip) for the respective colors (red, green and blue) may be successively scanned for output of non-amplified image signals from the respective pads AOR1, AOG1, AOB1 while also outputting amplified image signals from the respective pads AOR2, AOG2, AOB2. When the serial-in signal is output from the last bit of the shift register 21 at a relevant drop of the clock signal, the serial-in signal is input to a clear terminal of the chip selector 22 while also being taken out as a serial-out signal from the pad SO. As a result, the chip selector 22 of the first image sensor chip 5 keeps the select signal at the low level.

The serial-out signal from the pad SO of the first image sensor chip 5 (the left-end image sensor chip in FIG. 2) is input to the pad SI of the next image sensor chip 5 (second image sensor chip) as a serial-in signal. This causes the second image sensor chip 5 to operate in the same way as the first image sensor chip.

The third and any subsequent image sensor chips 5 operate successively in the same manner as the first and second image sensor chips.

Figure 6:
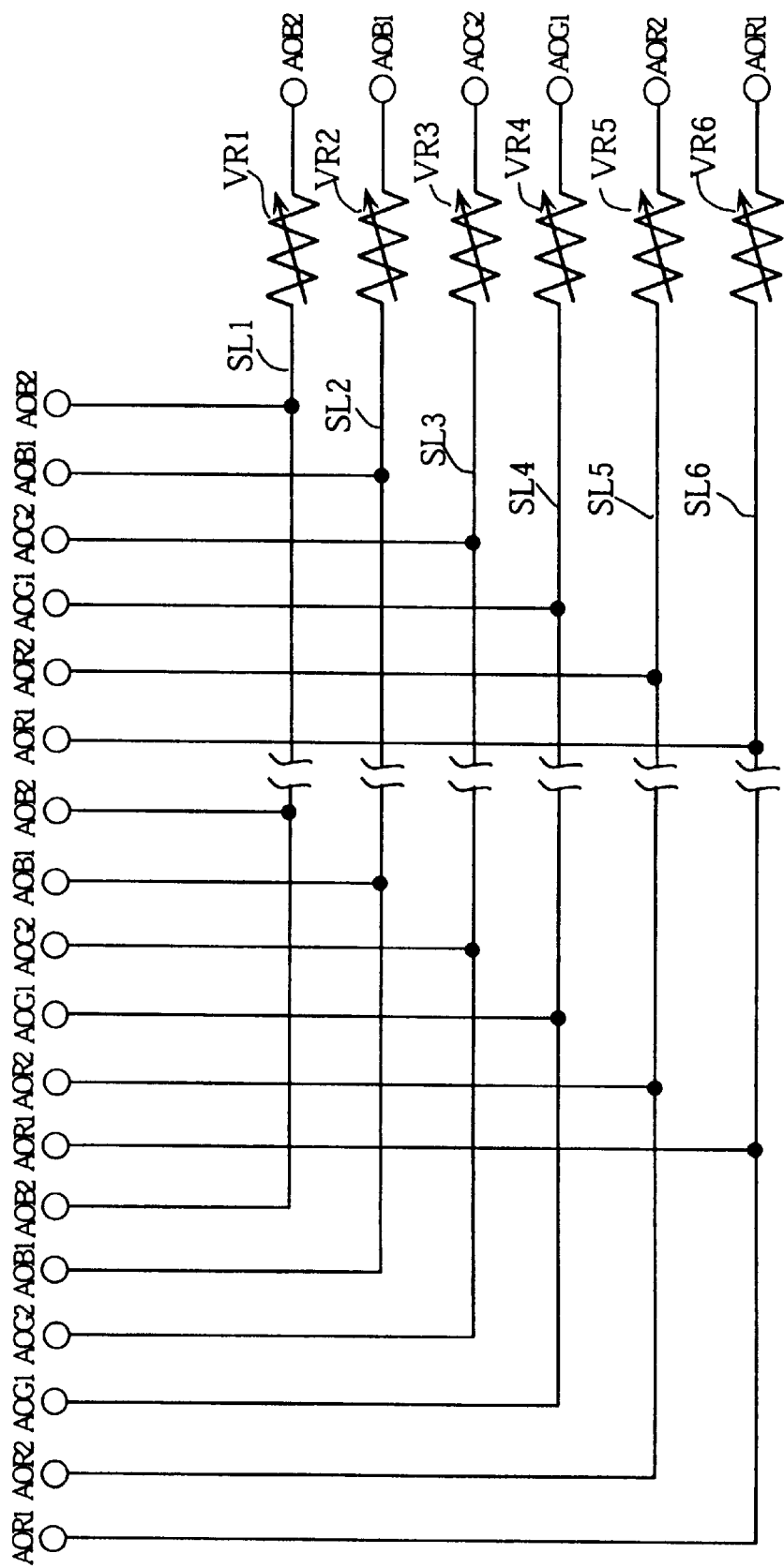
FIG. 6 is a view showing a circuit arrangement for adjusting the output of the image sensor chip.

As shown in FIG. 6, the non-amplified image signals and the amplified image signals output from the pads AOR1, AOG1, AOB1, AOR2, AOG2, AOB2 are separately transmitted via six different lines SL1~SL6 each including a respective variable resistor VR1~VR6. Such an arrangement makes it possible to equalize the output level of the respective image signals by separately adjusting the variable resistors VR1~VR6. The transmission lines SL1~SL6 together with the variable resistors VR1~VR6 may be provided on the circuit board 4.

The control IC chip 6 (see FIGS. 1 and 2) may incorporate various processing circuits necessary for processing the image signals obtained from the respective image sensor chips 5. For example the processing circuits include amplifying circuits for separately amplifying the image signals transmitted from the respective output pads AOR1, AOG1, AOB1, AOR2, AOG2, AOB2 before feeding them to the non-illustrated external circuit through the connector 40. Further, the control IC chip 6 may further incorporate a light sensor for detecting the luminance of the light received from the cold-cathode tube 7 through a light passage 12 (see FIG. 1), and for controlling the amplifying circuits to adjust the amplification factor in accordance with the luminance detection. The provision of the light sensor is preferred because the light luminance of the cold-cathode tube 7 is relatively low at the startup and increases with time before reaching a steady state.

Next, reference is made to FIGS. 7a~7d and 8a~8d to describe an example of using the contact-type line image scanner A to perform image reading. In FIGS. 8a~8d, a black dot indicates that a scanning step has already finished.

First, as shown in FIG. 7a, a document paper K is advanced on the glass cover 3, and the cold-cathode tube 7 (FIG. 1) is turned on to generate white light for irradiating the document paper K. The white light reflected on the document paper K is collected by the lens array 9 for focusing on the array of image sensor chips 5 (FIGS. 1 and 2), thereby forming a non-inverted, non-magnified image at the respective rows NR, NG, NB of light receiving elements 1R, 1G, 1B. First image reading takes place where the document paper K advances to a position at which the row of red light receiving elements 1R reads a first scanning line L1 of the paper K while the row of green light receiving elements 1G and the row of blue light receiving element 1B read a second scanning line L2 and a third scanning line L3, respectively, as shown in FIG. 8a. The interval between the reading lines L1, L2, L3 (including any subsequent reading lines) is equal to the pitch p2 (FIG. 3; 125 μm in the illustrated embodiment) between the rows NR, NG, NB of light receiving elements. As shown in FIG. 7b, the document paper K is advanced by 125 μm for performing second image reading. Specifically, the row of red light receiving elements 1R reads the second scanning line L2 of the document paper K while the row of green light receiving elements 1G and the row of blue light receiving element 1B read the third scanning line L3 and a fourth scanning line L4, respectively, as shown in FIG. 8b.

As shown in FIG. 7c, the document paper K is further advanced by 125 μm for performing third image reading. Specifically, the row of red light receiving elements 1R reads the third scanning line L3 of the document paper K while the row of green light receiving elements 1G and the row of blue light receiving element 1B read the fourth scanning line L4 and a fifth scanning line L5, respectively, as shown in FIG. 8c.

As shown in FIG. 7d, the document paper K is further advanced by 125 μm for performing fourth image reading. Specifically, the row of red light receiving elements 11R reads the fourth scanning line L4 of the document paper K while the row of green light receiving elements 1G and the row of blue light receiving element 1B read the fifth scanning line L5 and a sixth scanning line L6, respectively, as shown in FIG. 8d.

The image reading continues by repeating the above steps until the document paper K is entirely read.

As can be understood from FIG. 8c, the third scanning line L3 and any subsequent scanning lines of the document paper K are equally read by the respective rows NR, NG, NB of red, green and blue light receiving elements 1R, 1G, 1B. The image reading is effective from the third scanning line L3 and onwards, thereby making it possible to perform full-color image reading despite the fact that the respective rows NR, NG, NB of red, green and blue light receiving elements 1R, 1G, 1B deviate positionally from each other in the secondary scanning direction.

According to the illustrated embodiment, the document paper K is intermittently advanced at a constant pitch of 125 μm which is equal to the arrangement pitch p2 (FIG. 3) between the respective rows NR, NG, NB of light receiving elements 1R, 1G, 1B. Further, the primary scanning is also performed at the pitch p1 of 125 μm. Thus, the reading resolution in the primary scanning direction and in the secondary scanning direction is equalized to provide a good reading quality.

It should be appreciated that the reading resolution in the primary scanning direction and in the secondary scanning direction may be equalized as long as p2 is an integer multiple of p1. For instance, if p2 is double p1, the document paper K is advanced at a constant pitch which is equal to p1 while causing the respective rows NR, NG, NB of light receiving elements 1R, 1G, 1B to read the document paper K at the same pitch.

In the illustrated embodiment, each group of three light receiving elements 1R, 1G, 1B aligned in the secondary scanning direction for the respective colors provides one pixel or picture element. Therefore, it is possible to enlarge the width Sa (see FIG. 3) of each light receiving element as much as the primary scanning pitch p1 allows. Further, the length Sb (see also FIG. 3) of each light receiving element may be enlarged as much as practically possible. As a result, the light receiving area of each light receiving element can be maximized to provide a high output, so that the detected image is unlikely to be adversely influenced by entry of disturbing light.

Further, since the three light receiving elements 1R, 1G, 1B for each pixel do not positionally deviate from each other in the primary scanning direction, each group of three light receiving elements 1R, 1G, 1B can read the document paper K at the same position in the primary scanning direction without color deviations.

Moreover, in the illustrated embodiment, the row NG of green light receiving elements 1G is located between the row NR of red light receiving elements 1R and the row NB of blue light receiving elements 1B, and the lens array 9 focuses the reflected light from the document paper K at the row NG of green light receiving elements 1G. Since the green color image read by the row NG of green light receiving elements 1G is most influential on the printout reproduction of the read image, such an arrangement of the light receiving elements 1R, 1G, 1B is significant for realizing a high-fidelity printout reproduction of the read image.

Next, a method of preparing each of the image sensor chips 5 is described by referring to FIGS. 9~10, 11a~11c, 12, 13a~13c and 14a~14c.

Figure 9:
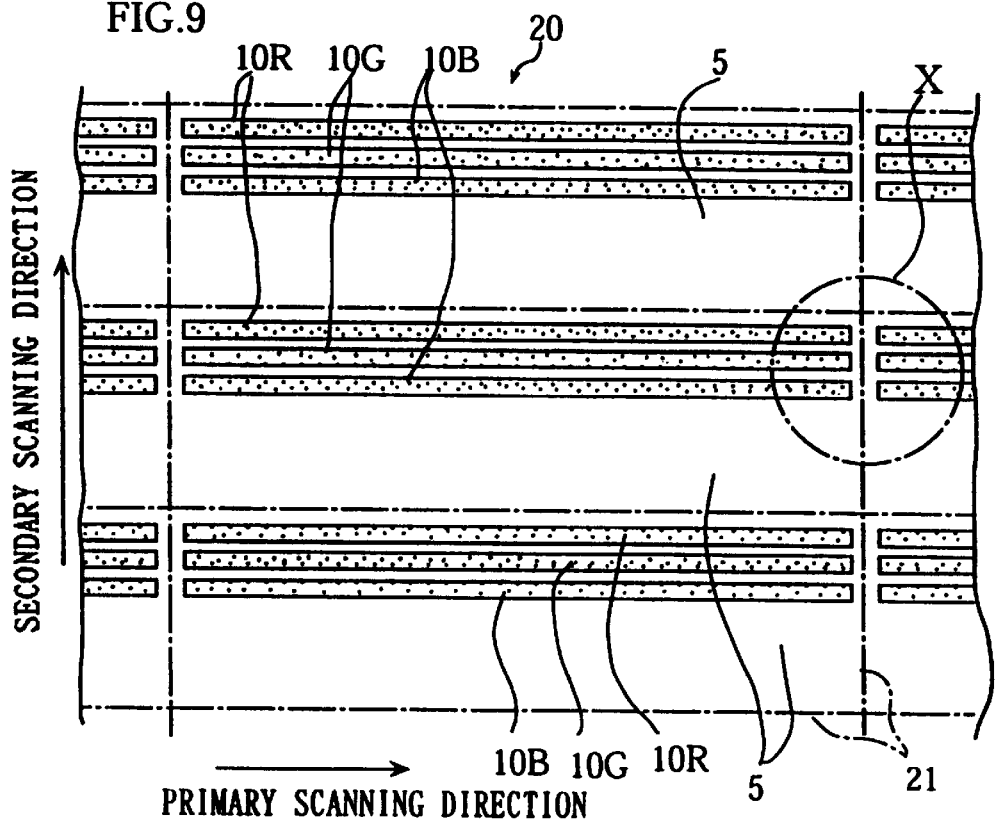
FIG. 9 is a plan view showing a silicon wafer used for making the image sensor chip.
Figure 10:
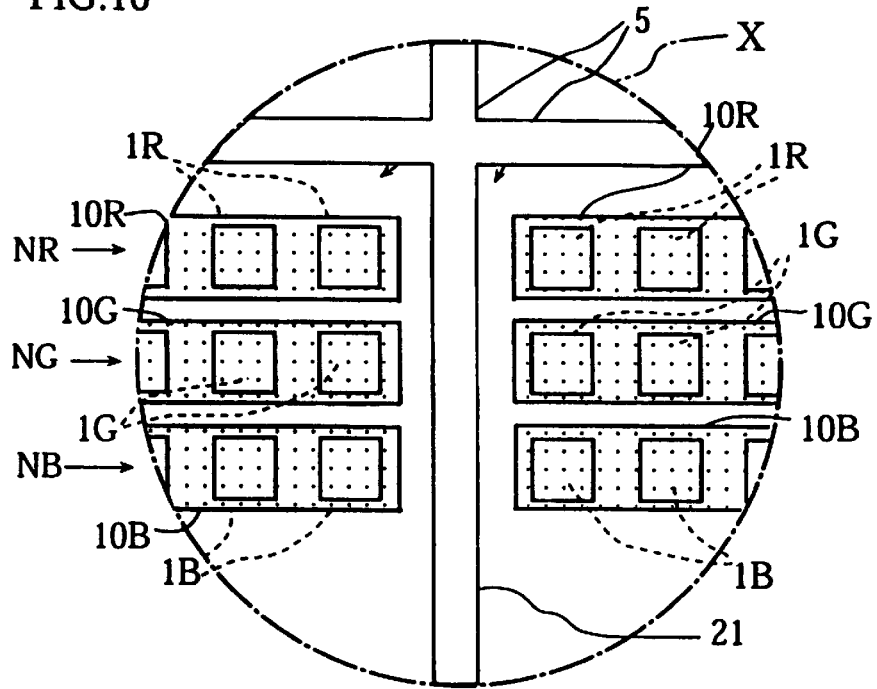
FIG. 10 is an enlarge fragmentary view showing the encircled portion X in FIG. 9.

First, as shown in FIGS. 9 and 10, a silicon wafer 20 is processed, in a known manner, to have multiple rows NR, NG, NB of built-in light receiving elements (phototransistors) 1R, 1G, 1B. The silicon wafer 20 provides a plurality of image sensor chips 5 when subsequently cut along vertical and horizontal dividing lines 21. Each of the rectangular regions of the wafer 20 which later provides a unit image sensor chip 5 includes three rows NR, NG, NB of light receiving elements 1R, 1G, 1B.

Then, as also shown in FIGS. 9 and 10, an appropriately colored filter 10R, 10G, 10B is formed on the silicon wafer 20 to fully cover each row NR, NG, NB of light receiving elements 1R, 1G, 1B. At this time, the filter should be formed not to traverse or cross the dividing lines 21 because otherwise the filter may be peeled off or be damaged when the silicon wafer 20 is subsequently cut with a diamond blade for example.

Figure 11A:
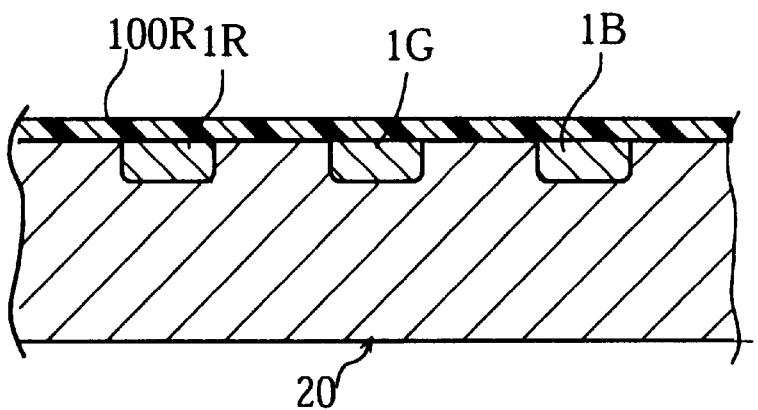
FIGS. 11a through 11c are sectional views showing the successive steps of making a red filter.
Figure 11B:
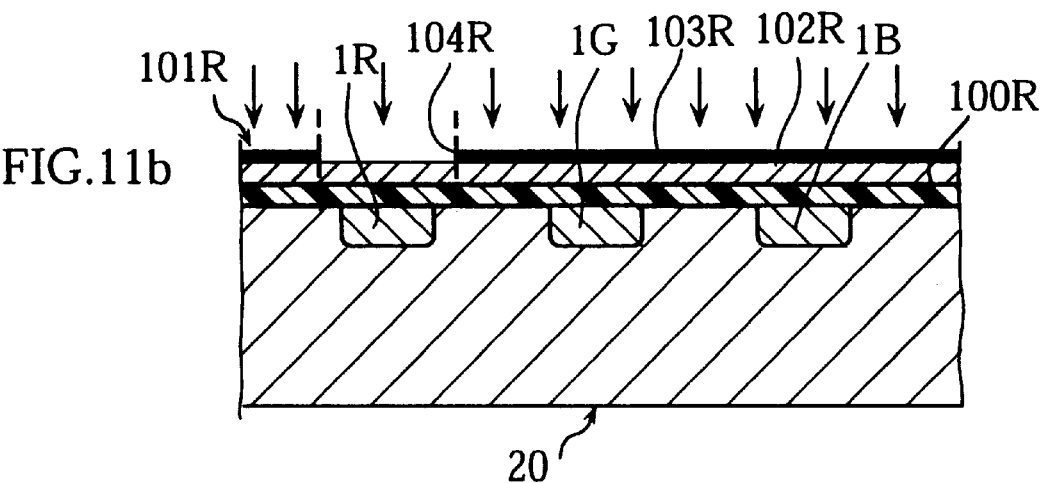
Figure 11C:
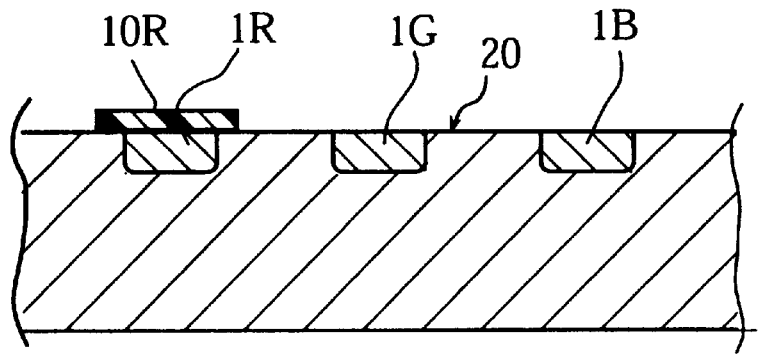

FIGS. 11a~11c illustrate an example of making a red filter 10R.

First, as shown in FIG. 11a, a red resin coating 100R is formed by uniformly applying a red-colored photosensitive resin on the silicon wafer 20 after cleaning the wafer. The red-colored photosensitive resin may be prepared by diluting polyvinyl cinnamate with an organic solvent to a suitable viscosity and adding a red-coloring agent. The application of the photosensitive resin onto the wafer 20 may be performed by the known spin-coating process. The red resin coating 100R thus obtained is pre-baked at about 120° C. for drying (i.e., preliminary curing).

Figure 12:
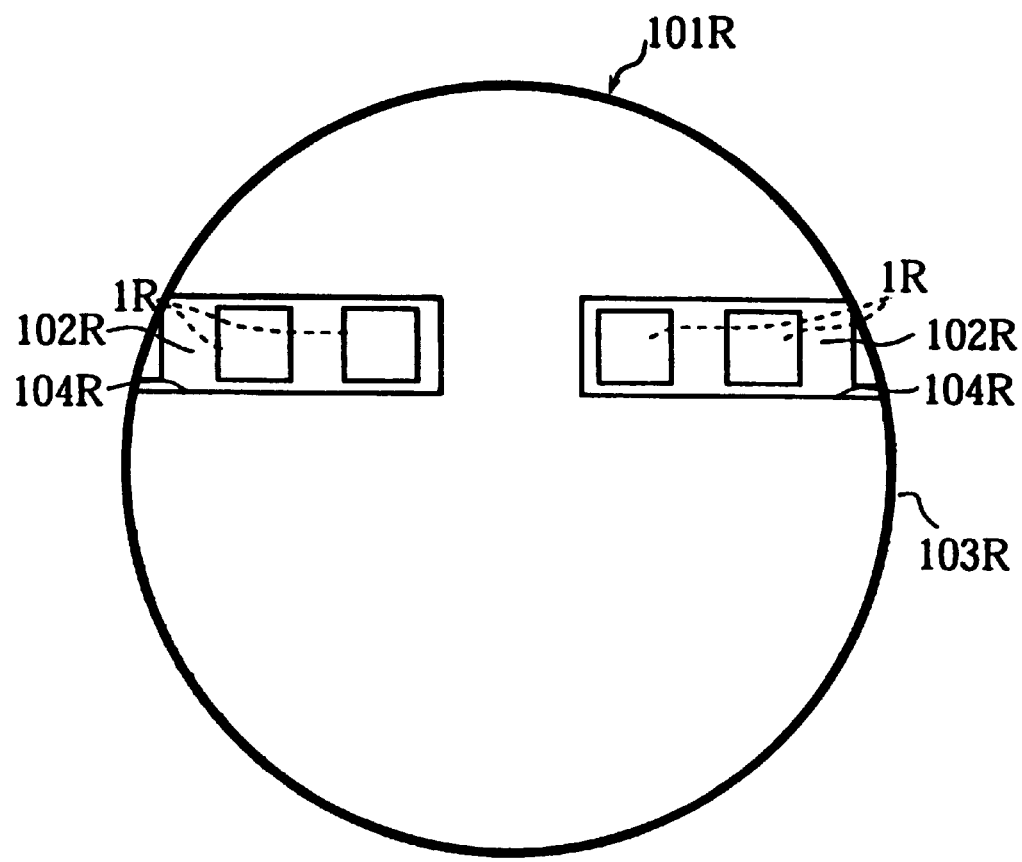
FIG. 12 is a plan view showing a mask which is used for performing the step shown in FIG. 11b.

Then, as shown in FIG. 11b, a mask 101R having a window 104R in corresponding relation to each row NR of red light receiving elements 1R is placed on the red resin coating 100R, and a portion of the coating 100R corresponding to each row NR of red light receiving elements 1R is exposed to ultraviolet radiation for hardening by polymerization. The mask 101R includes a glass plate 102R and a light-impervious metal film 103R applied on the glass plate 102R. As shown in FIG. 12, the window 104R of the metal film 103R becomes discontinuous at a position between each two adjacent rows NR of red light receiving elements 1R, so that the red filter 10R does not traverse the dividing line 21.

Then, as shown in FIG. 11c, the non-hardened portions of the red resin coating 100R is etched away by dissolving with a suitable etching solution (development) after removing the mask 100R. Finally, after rinsing, the remaining portions of the red resin coating 100R are subjected to post-baking for final hardening. As a result, a red filter 10R is formed at each row NR of red light receiving elements 1R.

Figure 13A:
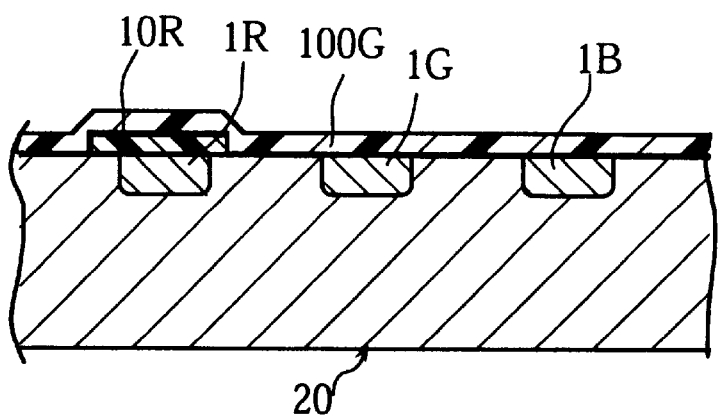
FIGS. 13a through 13c are sectional views showing the successive steps of making a green filter.
Figure 13B:
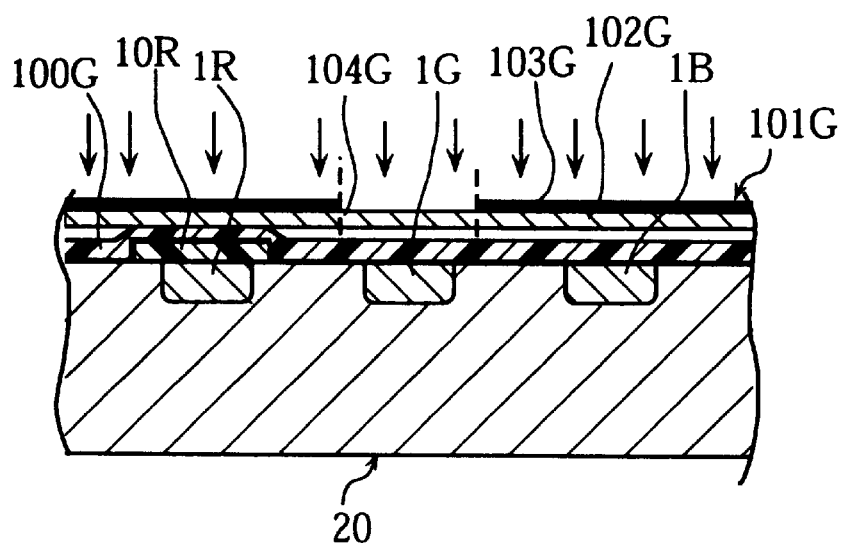
Figure 13C:
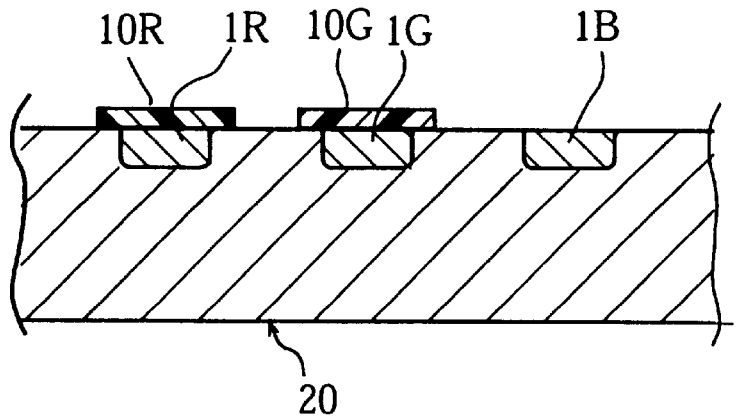

FIGS. 13a~13c illustrate an example of making a green filter 10G.

First, as shown in FIG. 13a, a green resin coating 100G is formed by uniformly applying, after cleaning, a green-colored photosensitive resin on the silicon wafer 20 over the red filter 10R. The red-colored photosensitive resin may be prepared by diluting polyvinyl cinnamate with an organic solvent to a suitable viscosity and adding a green-coloring agent. The application of the photosensitive resin onto the wafer 20 may be performed by the known spin-coating process. The green resin coating 100G thus obtained is pre-baked at about 120° C. for drying.

Then, as shown in FIG. 13b, a mask 101G having a window 104G in corresponding relation to each row NG of green light receiving elements 1G is placed on the green resin coating 100G, and a portion of the coating 100G corresponding to each row NG of green light receiving elements 1G is exposed to ultraviolet radiation for hardening by polymerization. The mask 101G includes a glass plate 102G and a light-impervious metal film 103G applied on the glass plate 102G.

Then, as shown in FIG. 13c, the non-hardened portions of the green resin coating 100G is etched away by dissolving with a suitable etching solution (development) after removing the mask 100G. Finally, after rinsing, the remaining portions of the green resin coating 100G are subjected to post-baking for final hardening. As a result, a green filter 10G is formed at each row NG of green light receiving elements 1G.

Figure 14A:
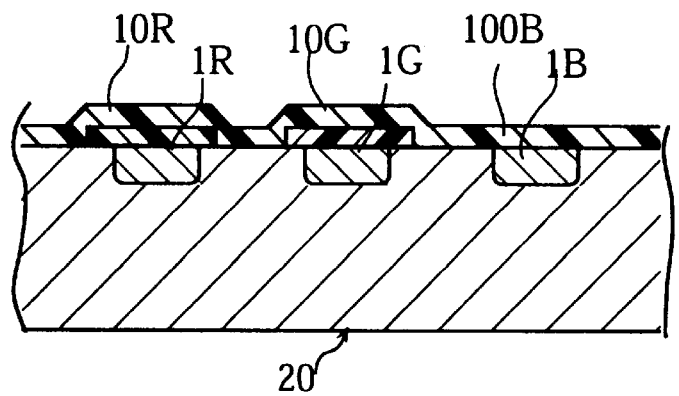
FIGS. 14a through 14c are sectional views showing the successive steps of making a blue filter.
Figure 14B:
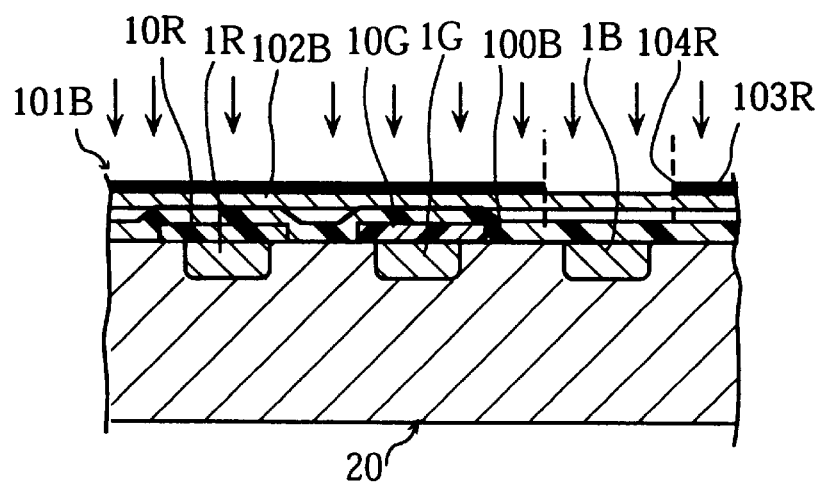
Figure 14C:
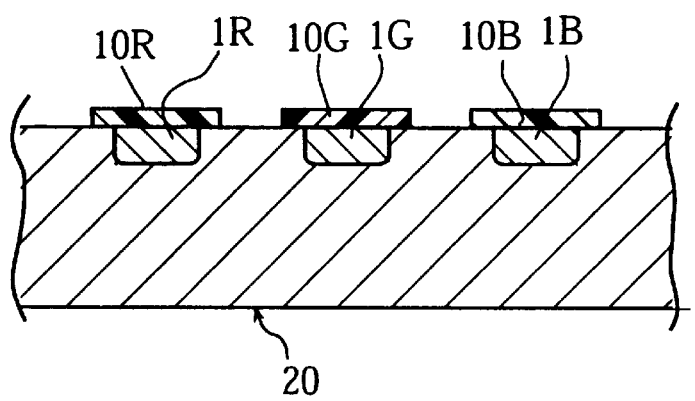

FIGS. 14a~14c illustrate an example of making a blue filter 10B.

First, as shown in FIG. 14a, a blue resin coating 100B is formed by uniformly applying, after cleaning, a blue-colored photosensitive resin on the silicon wafer 20 over the red filter 10R and the green filter 10G. The blue-colored photosensitive resin may be prepared by diluting polyvinyl cinnamate with an organic solvent to a suitable viscosity and adding a blue-coloring agent. The application of the photosensitive resin onto the wafer 20 may be performed by the known spin-coating process. The blue resin coating 100B thus obtained is pre-baked at about 120° C. for drying.

Then, as shown in FIG. 14b, a mask 101B having a window 104B in corresponding relation to each row NB of blue light receiving elements 1B is placed on the blue resin coating 100B, and a portion of the coating 100B corresponding to each row NB of blue light receiving elements 1B is exposed to ultraviolet radiation for hardening by polymerization. The mask 101B includes a glass plate 102B and a light-impervious metal film 103B applied on the glass plate 102B.

Then, as shown in FIG. 14c, the non-hardened portions of the blue resin coating 100B is etched away by dissolving with a suitable etching solution (development) after removing the mask 100B. Finally, after rinsing, the remaining portions of the blue resin coating 100B are subjected to post-baking for final hardening. As a result, a blue filter 10B is formed at each row NB of blue light receiving elements 1B.

Returning to FIGS. 9 and 10, the silicon wafer 20 is cut along the dividing lines 21 after forming the three kinds of filters 10R, 10G, 10B, thereby providing a plurality of image sensor chips 5. The cutting may be performed by using a diamond blade or a laser beam.

Figure 20:
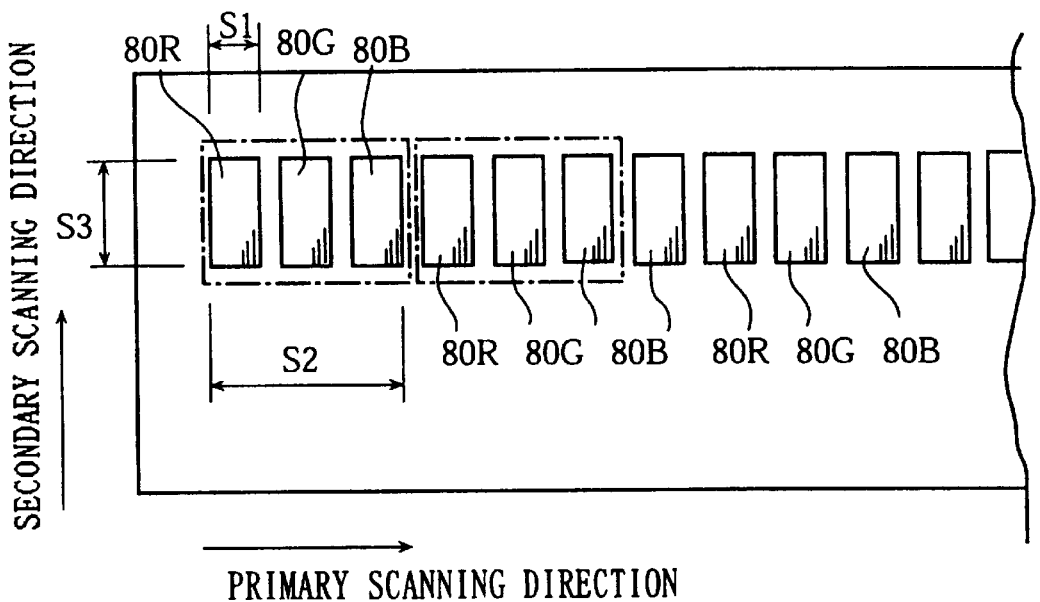
FIG. 20 is a plan view showing a prior art image sensor chip.
Figure 21:
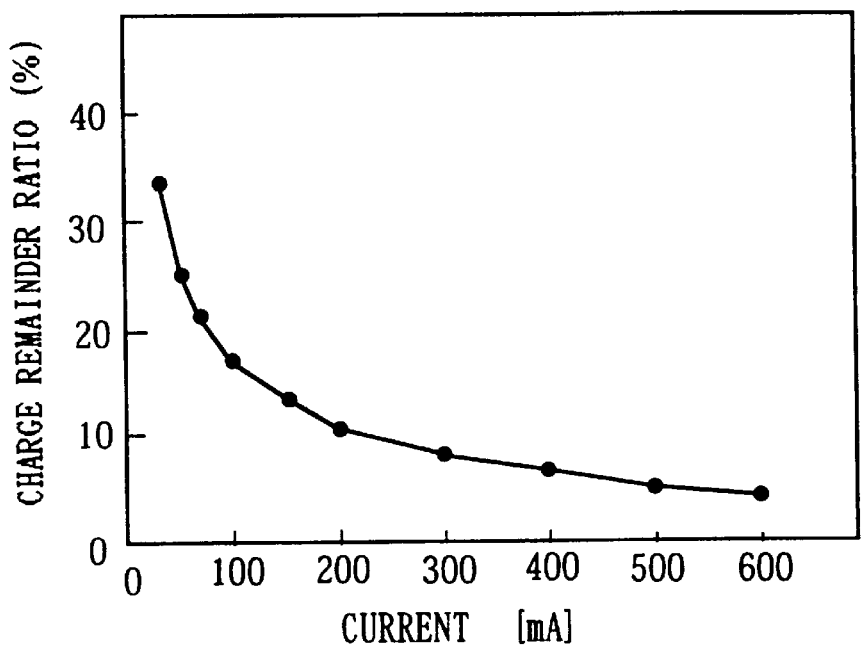
FIG. 21 is a graph showing the characteristics of the prior art image sensor chip.

According to the illustrated embodiment, each row NR, NG, NB of light receiving elements 1R, 1G, 1B is commonly covered by a correspondingly colored filter 10R, 10G, 10B. Thus, compared with the prior art of FIG. 20, it is unnecessary to cover each individual light receiving element with a separate filter, so that the manufacturing process may be greatly facilitated. Further, since each filter 10R, 10G, 10B is a strip which is relatively long, it is less likely to be peeled off in comparison with the prior art of FIG. 20 wherein each individual light receiving element is covered by a correspondingly sized fragmentary filter. Moreover, since each strip filter 10R, 10G, 10B is slightly larger in size than a corresponding row NR, NG, NB of light receiving elements 1R, 1G, 1B, non-filtered components of light are unlikely to be detected by the image sensor chip 5 as noises.

Figure 15:
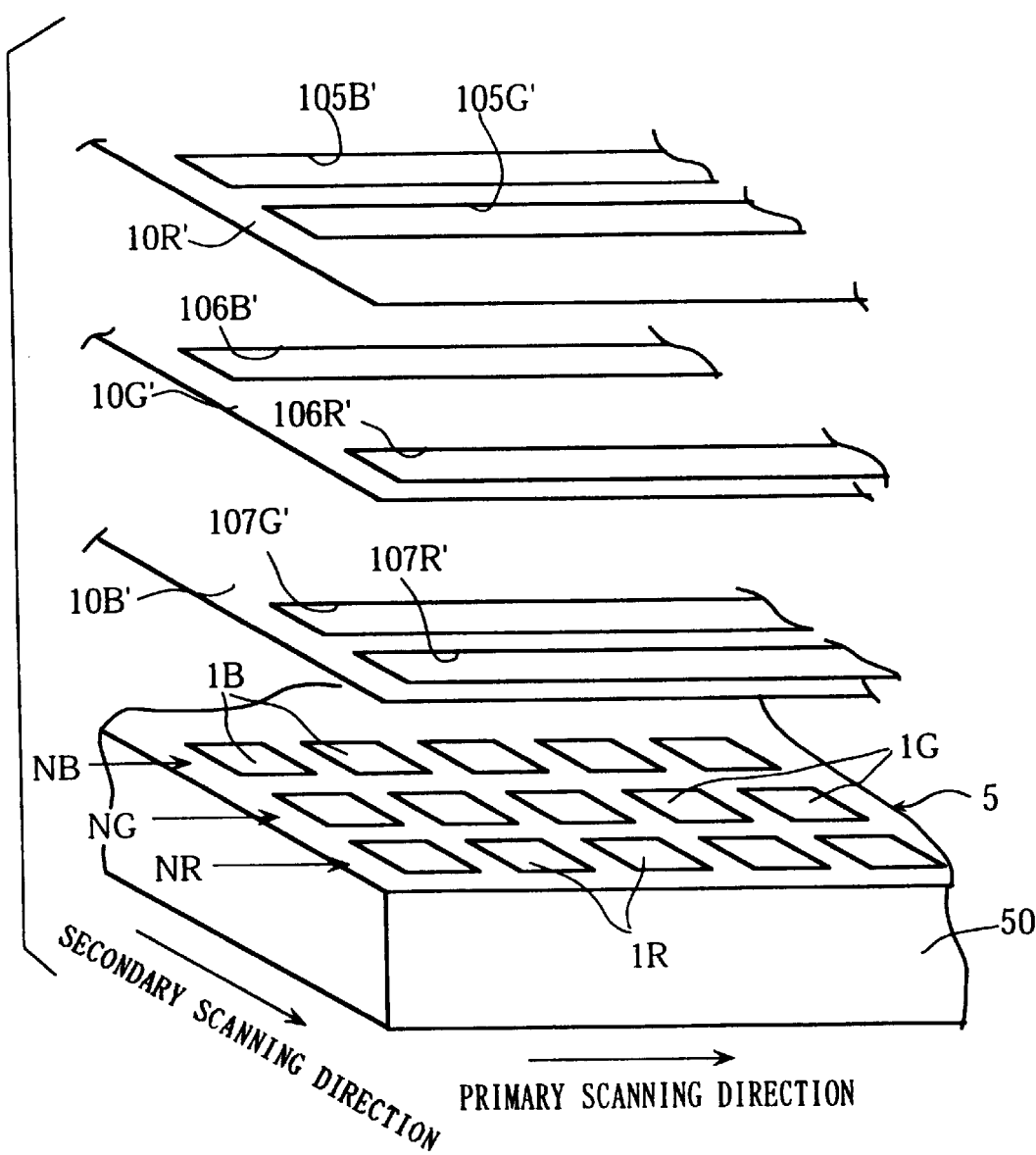
FIG. 15 is an exploded perspective view showing a filter laminate which is usable for the image sensor chip.
Figure 16:
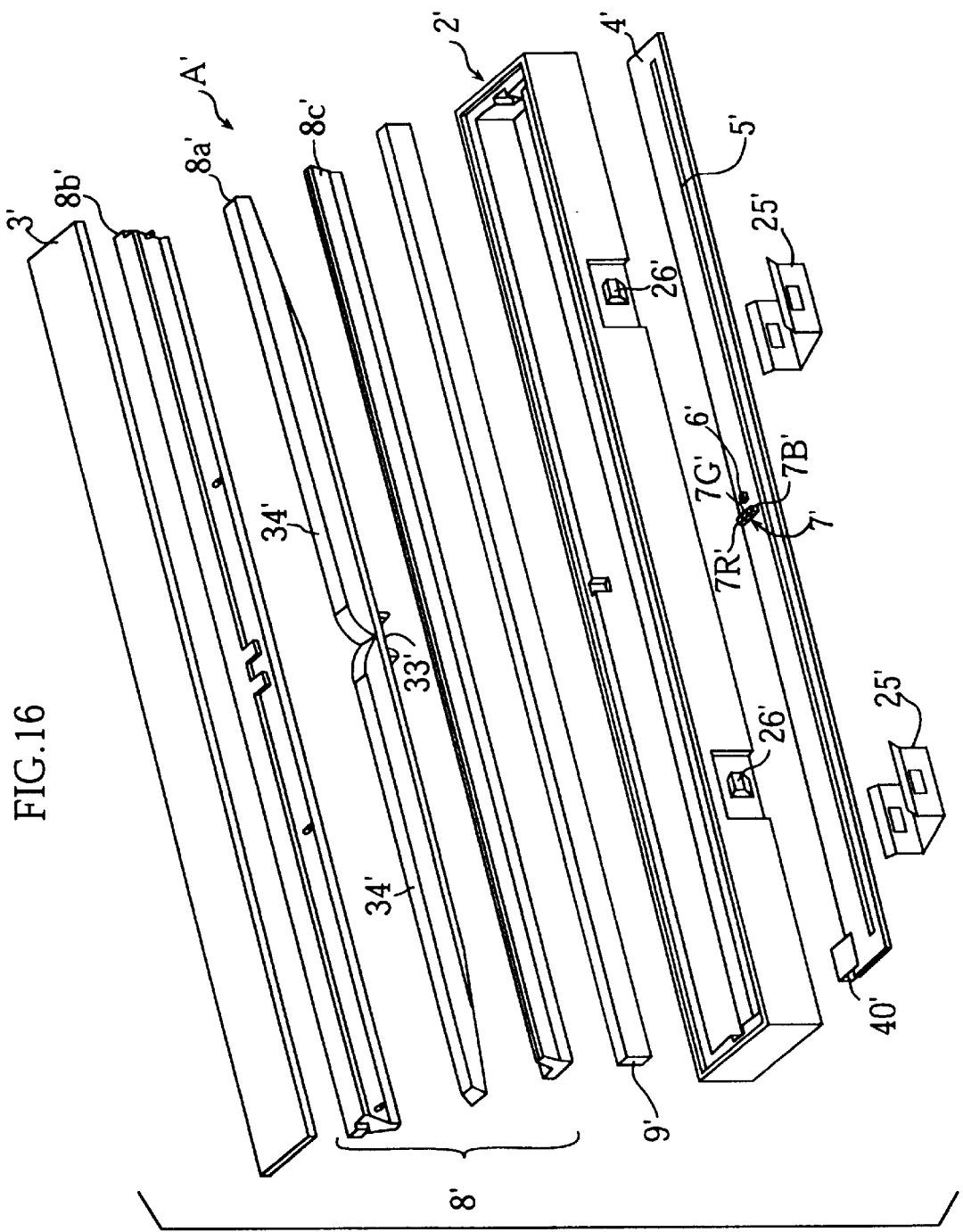
FIG. 16 is an exploded perspective view showing an image reading apparatus according to a second embodiment of the present invention.
Figure 17:
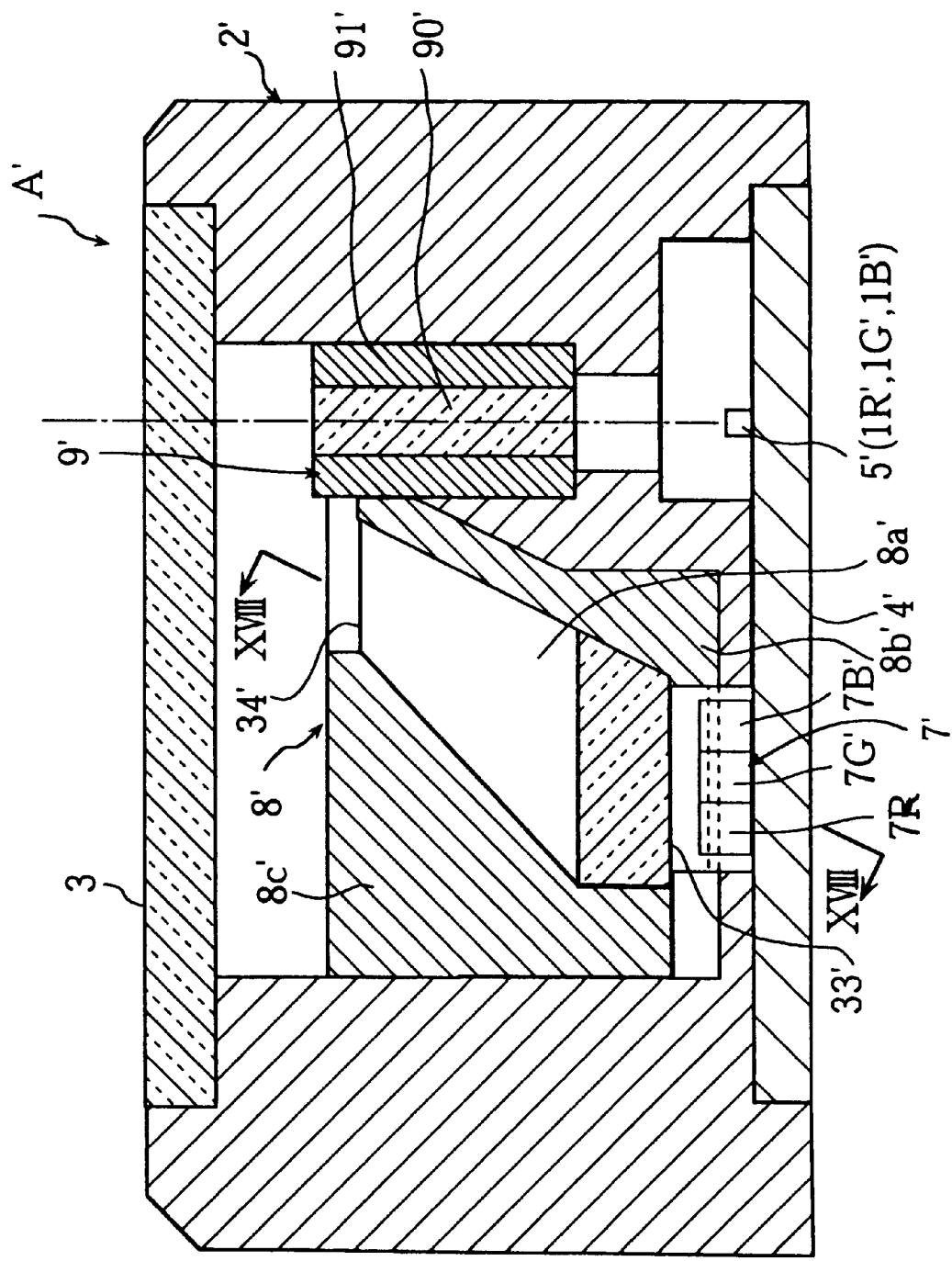
FIG. 17 is a sectional view showing the image reading apparatus of FIG. 16.
Figure 18:
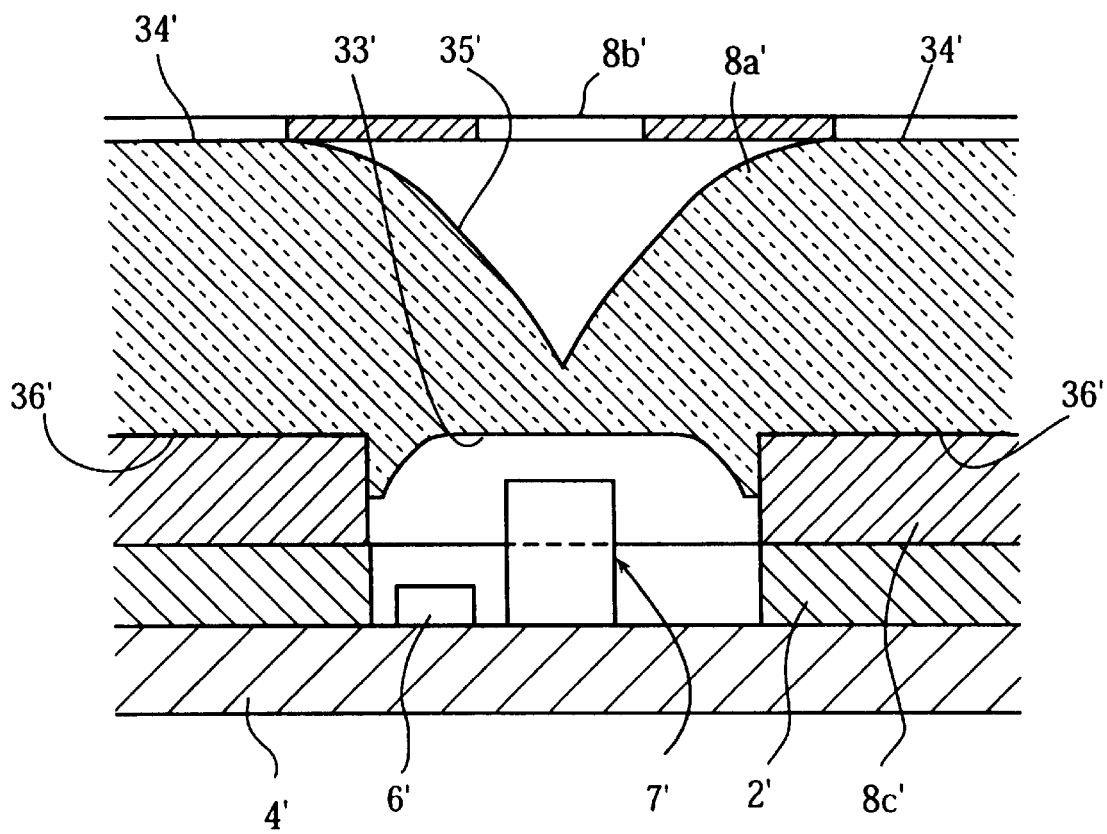
FIG. 18 is a sectional view taken along lines XVIII—XVIII in FIG. 17.

FIG. 15 illustrates an example of filter laminate for use in each image sensor chip 5. Specifically, the filter laminate comprises a red filter film 10R', a green filter film 10G' and a blue filter film 10B'. The red filter film 10R' has two windows 105G', 105B' at respective positions corresponding to the row NG of green light receiving elements 1G and the row NB of blue light receiving elements 1B, whereas the green filter film 10G' has two windows 106R', 106B' at respective positions corresponding to the row NR of red light receiving elements 1R and the row NB of blue light receiving elements 1B. Similarly, the blue filter film 10B' has two windows 107R', 107G' at respective positions corresponding to the row NR of red light receiving elements 1R and the row NG of green light receiving elements 1G.

The respective filter films 10R', 10G', 10B' may be laminated on the silicon substrate 50 in any order. In the example of FIG. 15, for instance, the blue filter film 10B' is first placed on the silicon substrate 50, and the green filter film 10G' is then laminated on the blue filter film 10B', and the red filter film 10R' is then laminated on the green filter film 10G'. The respective filter films 10R', 10G', 10B' may be laminated on each other in advance, and the resulting laminate may be later attached on the silicon substrate 50.

With the use of the filter laminate, the red filter film 10R' allows selective passage of red light, whereas the green filter film 10G' allows selective passage of green light. Similarly, the blue filter film 10B' allows selective passage of blue light. Thus, due to the provision of the respective windows 105B', 105G', 106B', 106R', 107G', 107R' at appropriate positions, each row NR, NG, NB of light receiving elements 1R, 1G, 1B can receiving relevant color light.

On the other hand, the portions of the filter laminate where no window is provided serves like a black filter which allows no passage of light. Thus, the portions of the filter laminate surrounding each row NR, NG, NB of light receiving elements 1R, 1G, 1B functions as a light interrupter which prevents entry of noise-forming light, and no separate means needs to be provided for preventing entry of noise-forming light.

FIGS. 16~19 show an overall view of another image reading apparatus according to a second embodiment of the present invention. The image reading apparatus of this embodiment is also a contact-type line image scanner A' which mainly comprises a case 2', a glass cover 3', a circuit board 4', a light source 7', a light guide 8', and a lens array 9'.

The case 2' accommodates the various components described above. The case 2' maybe made of a synthetic resin for example. The case 2' is elongated in one direction and has a box configuration.

The glass cover 3' is mounted on the case 2' from above to close an upper opening thereof.

The circuit board 4' is attached to the case 2' from below to close a lower opening thereof. The circuit board 4' may be attached to the case 2' by engaging a pair of fixing members 25 with lateral projections 26 on the case 2'.

The circuit board 4' has an upper surface (inner surface with respect to the case 2') for mounting an array of image sensor chips 5' and a control IC chip 6' for controlling the array of image sensor chips. In the second embodiment, the circuit board 4' is also utilized for mounting the light source 7'. Though not shown, the upper surface of the circuit board 4' is also formed with a wiring pattern for the control IC chip 6', the array of image sensor chips 5' and for the light source 7'.

Figure 19:
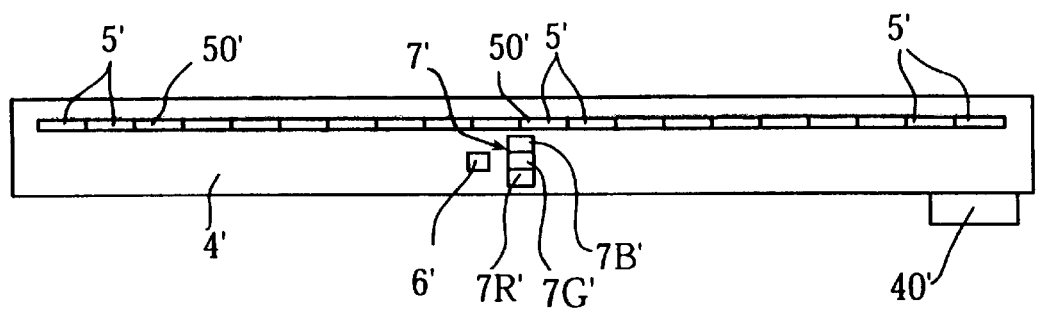
FIG. 19 is a plan view showing a circuit board incorporated in the image reading apparatus of FIG. 16.

As shown in FIG. 19, the circuit board 4' is elongated in the primary scanning direction, and the array of image sensor chips 5' extends in the primary scanning direction. Further, as also shown in FIG. 19, the circuit board 4' is provided with a connector 40' for establishing connection with an external circuit or unit (not shown).

According to the second embodiment, the light source 7' mounted centrally on the circuit board 4' comprises three different light generators 7R', 7G', 7B'. More specifically, the light source 7' includes a red LED 7R' (light emitting diode), a green LED 7G' and a blue LED 7B'. Alternatively, the light source 7' may comprise a single white light generator.

The light guide 8' serves to propagate the light from the light source 7' longitudinally of the case 2' while also directing the light toward the glass cover 3'. The light guide 8' comprise a light propagator 8a', a first reflector 8b' and a second reflector 8c'. The light propagator 8a' may be made of a transparent resin such as an acrylic resin (e.g., PMMA: poly(methyl methacrylate)). Each of the first and second reflectors 8b', 8c' may be made of a white resin which may be prepared by adding a white coloring agent in a resin solution.

The light propagator 8a' is an elongated bar and has a central V-recess 35'. Further, the light propagator 8a' has an incident bottom central surface 33', a pair of top outlet surfaces 34', and a pair of irregularly reflecting bottom wing surfaces 36'. The incident bottom surface 33' is positioned immediately above the light source 7' and immediately below the V-recess 35' for allowing entry of the light generated by the light source 7'. The irregularly reflecting bottom wing surfaces 36' serve to propagate the incident light within the light propagator 8a' longitudinally thereof, whereas the top outlet surfaces 34' allow exit of the propagating light uniformly over the entire length the light propagator 8a'.

The light propagator 8a' is sandwiched between the first reflector 8b', and the second reflector 8c' in intimate contact therewith. Each of the two reflectors 8b', 8c' reflects leaking part of the propagating light back into the light propagator 8a', thereby increasing the efficiency of light propagation.

The lens array 9' and each of the image sensor chips 5' are substantially identical to those of the first embodiment. Therefore, the details of these components are not described here.

Further, the image scanner A' of the second embodiment operates substantially in the same manner as that of the first embodiment.

The preferred embodiments of the present invention being thus described, it is obvious that the same may be varied in various ways. For instance, the present invention is applicable not only to a contact-type line image scanner but also to a flat-bed-type image scanner wherein an image scanner head is moved relative to a stationary document paper. Such variations should not be regarded as a departure from the spirit and scope of the invention, and all such variations as would be obvious to those skilled in the art are intended to be included within the scope of the appended claims.

What is claimed is:

1. An image reading apparatus comprising:

a light source for irradiating a document sheet with light;

a row of red light receiving elements arranged in a primary scanning direction for detecting a red component of the light reflected on the document sheet;

a row of green light receiving elements arranged in the primary scanning direction for detecting a green component of the reflected light;

a row of blue light receiving elements arranged in the primary scanning direction for detecting a blue component of the reflected light;

a red filter commonly covering the row of red light receiving elements for allowing selective passage of red light;

a green filter commonly covering the row of green light receiving elements for allowing selective passage of green light; and a blue filter commonly covering the row of blue light receiving elements for allowing selective passage of blue light;

wherein the row of red light receiving elements, the row of green light receiving elements and the row of blue light receiving elements are displaced from each other in a secondary scanning direction which is perpendicular to the primary scanning direction;

wherein each of the filters comprises a correspondingly colored film; and wherein the films constituting the filters are laminated, the red filter film having windows corresponding to the row of green light receiving elements and the row of blue light receiving elements, the green filter film having windows corresponding to the row of red light receiving elements and the row of blue light receiving elements, the blue filter film having windows corresponding to the row of red light receiving elements and the row of green light receiving elements.

2. The image reading apparatus according to claim 1, wherein the light receiving elements in each row are arranged at a first pitch in the primary scanning direction, the row of red light receiving elements, the row of green light receiving elements and the row of blue light receiving elements being arranged at a second pitch in the secondary scanning direction, the second pitch being an integer multiple of the first pitch.

3. The image reading apparatus according to claim 2, wherein the second pitch is equal to the first pitch.

4. The image reading apparatus according to claim 1, wherein the row of green light receiving elements is positioned between the row of red light receiving elements and the row of blue light receiving elements.

5. The image reading apparatus according to claim 4, further comprising a lens array for focusing the reflected light at the row of green light receiving elements.

6. The image reading apparatus according to claim 1, wherein the light source comprises an elongated lamp.

7. The image reading apparatus according to claim 6, wherein the elongated lamp is a cold-cathode tube.

8. The image reading apparatus according to claim 1, wherein the light source comprises a plurality of light emitting diodes each generating light of a different color.

9. The image reading apparatus according to claim 8, further comprising a light guide for propagating the light from the light emitting diodes in the primary scanning direction and for directing the propagating light toward the document sheet.

10. The image reading apparatus according to claim 1, further comprising adjusting means for adjusting output of each light receiving element.

11. An image sensor chip comprising:

a single chip substrate;

a row of red light receiving elements built in chip substrate and arranged in a first direction for detecting red light;

a row of green light receiving elements built in said single chip substrate and arranged in the first direction for detecting green light;

a row of blue light receiving elements built in said single chip substrate and arranged in the first direction for detecting blue light;

a red filter commonly covering the row of red light receiving elements for allowing selective passage of red light;

a green filter commonly covering the row of green light receiving elements for allowing selective passage of green light; and a blue filter commonly covering the row of blue light receiving elements for allowing selective passage of blue light;

wherein the row of red light receiving elements, the row of green light receiving elements and the row of blue light receiving elements are displaced from each other in a second direction which is perpendicular to the first direction;

wherein each of the filters comprises a correspondingly colored film; and wherein the films constituting the filters are laminated, the red filter film having windows corresponding to the row of green light receiving elements and the row of blue light receiving elements, the green filter film having windows corresponding to the row of red light receiving elements and the row of blue light receiving elements, the blue filter film having windows corresponding to the row of red light receiving elements, and the row of green light receiving elements.

12. The image sensor chip according to claim 11, wherein each row of light receiving elements is surrounded by a light-impervious portion.

13. The image reading apparatus according to claim 11, wherein the light receiving elements in each row are arranged at a first pitch in the first direction, the row of red light receiving elements, the row of green light receiving elements and the row of blue light receiving elements being arranged at a second pitch in the second direction, the second pitch being an integer multiple of the first pitch.

14. The image sensor chip according to claim 13, wherein the second pitch is equal to the first pitch.

15. The image sensor chip according to claim 11, wherein the row of green light receiving elements is positioned between the row of red light receiving elements and the row of blue light receiving elements.

16. An image reading apparatus comprising:

an elongate circuit board having a longitudinally central portion and a pair of end portions;

a light source mounted at the central portion of the circuit board for irradiating a document sheet with light;

a row of red light receiving elements mounted on the circuit board to extend in a primary scanning direction longitudinally of the circuit board for detecting a red component of the light reflected on the document sheet;

a row of green light receiving elements mounted on the circuit board to extend in the primary scanning direction for detecting a green component of the reflected light;

a row of blue light receiving elements mounted on the circuit board to extend in the primary scanning direction for detecting a blue component of the reflected light; and an elongate light guide extending in the primary scanning direction for propagating the light from the light source in the primary scanning direction and for directing the propagating light toward the document sheet;

wherein the row of red light receiving elements, the row of green light receiving elements and the row of blue light receiving elements are displaced from each other in a secondary scanning direction which is perpendicular to the primary scanning direction;

wherein the light guide includes a central incident surface for allowing entry of the light from the light source, and means for directing the entering light toward the end portions of the circuit board.

17. The image reading apparatus according to claim 16, wherein the light guide comprises a light propagator made of a transparent material, the directing means comprising a V-recess formed in the light propagator directly above the light source and the central incident surface of the light guide.

18. The image reading apparatus according to claim 17, wherein the light propagator has a pair of irregularly reflecting bottom wing surfaces on both sides of the central incident surface of the light guide.

19. The image reading apparatus according to claim 17, further comprising a first and a second reflectors between which the light propagator is sandwiched.

20. The image reading apparatus according to claim 16, wherein the light source comprises a plurality of light emitting diodes each generating light of a different color.

* * * * *